Patented Feb. 16, 1926.

1,573,233

UNITED STATES PATENT OFFICE.

ROBERT B. ELDREDGE, OF DENVER, COLORADO.

PROCESS FOR TREATING ZINC-SULPHATE SOLUTIONS.

No Drawing.   Application filed October 13, 1924.   Serial No. 743,474.

*To all whom it may concern:*

Be it known that I, ROBERT B. ELDREDGE, a citizen of the United States, residing at Denver, in the county of Denver and State of Colorado, have invented certain new and useful Improvements in Processes for Treating Zinc-Sulphate Solutions, of which the following is a specification.

This invention relates to a process of treating zinc sulphate solutions for the purpose of adapting them for different industrial uses.

The primary object of the process is to purify an impure zinc sulphate solution by separating out of the solution the therein contained elements or combinations of elements other than zinc or zinc compounds, and a further aim of the process is to convert a zinc sulphate solution purified as stated hereinabove, to a substantially pure solution of zinc sulphate only.

With the above and other objects in view, the process consists in treating the impure zinc sulphate solution with a hydrosulfite or more particularly with a metal hydrosulfite such as zinc hydrosulfite, sodium hydrosulfite or potassium hydrosulfite. Of the three compounds, zinc hydrosulfite ($ZnS_2O_4$) is preferred, more especially since it can be produced in the impure zinc sulphate solution by the addition of zinc in pulverous or granulated form in the presence of sulphur dioxide gas ($SO_2$).

It is desirable to conduct the purification step of the process at an advanced temperature by reason of the reducing action of heat on metals in solution.

The treatment of the impure zinc sulphate solution by the addition of the hydrosulfite, preferably in the presence of heat, causes the precipitation of such elements as cobalt, nickel, manganese, iron, copper, mercury, cadmium, arsenic, antimony, silver, gold, lead, bismuth, thallium, selenium, or tellurium, all of which may be classed as impurities with reference to a zinc sulphate solution.

The impurities singly or in combinations, thus precipitated, are separated from the solution by filtration or sedimentation or other suitable treatment and the resulting substantially pure solution of zinc sulphate and zinc hydrosulfite can be used directly for electrolysis to make metallic zinc, or for other purposes.

When zinc hydrosulfite is produced in the impure solution, by adding zinc and passing into the solution sulphur dioxide gas, the impurities are precipitated as before and inasmuch as the zinc hydrosulfite thus produced will precipitate any of the elements mentioned hereinbefore, the zinc used does not need to be absolutely pure.

The hydrosulfite is added to the impure zinc sulphate solution in quantities varying in accordance with the nature and amounts of impurities in the solution and it is for this reason not possible to give the proportion of the reagent to the material under treatment with any degree of accuracy.

The best method of procedure is to add the hydrosulfite to the solution either continuously or at short intervals until the desired result has been attained.

The material may be heated to any temperature required to expedite the precipitation of the impurities as hereinbefore explained.

When sodium hydrosulfite ($Na_2S_2O_4$) or potassium hydrosulfite ($K_2S_2O_4$) are used to precipitate the impurities out of the impure zinc sulphate solution, in the place of zinc hydrosulfite, the resulting zinc sulphate solution will contain sodium sulphate or potassium sulphate which, although their presence is not desirable in all uses of the purified solution, are harmless in other uses of the same.

The process so far described may be extended for the production of a pure zinc sulphate solution by passing air into the purified solution of zinc sulphate and zinc hydrosulfite, and thereby oxidizing the zinc hydrosulfite to zinc sulphate.

Having thus described my invention, what I claim and desire to secure by Letters Patent it:

1. The herein described process of treating impure zinc sulphate solutions, comprising the precipitation of inorganic impurities in the solution by the action of a soluble hydrosulfite, and separating the precipitate from the solution.

2. The herein described process of treating impure zinc sulphate solutions, comprising the precipitation of inorganic impurities in the solution by the action of a soluble hydrosulfite in the presence of heat, and separating the precipitate from the solution.

3. The herein described process of treating impure zinc sulphate solutions, comprising the precipitation of impurities in the solution by the action of zinc hydrosulfite, and separating the precipitate from the solution.

4. The herein described process of treating impure zinc sulphate solutions, comprising the precipitaton of inorganic impurities in the solution by the addition of zinc in a divided form, in the presence of sulphur dioxide gas, and separating the precipitate from the solution.

5. The herein described process of treating impure zinc sulphate solutions, consisting in causing the precipitation of inorganic impurities in the solution by the action of a soluble metal hydrosulfite precipitant, separating the precipitate from the solution, to obtain a pure solution of zinc sulphate and metal hydrosulfite, and oxidizing the metal hydrosulfite to metal sulphate by passing air into the purified solution.

6. The herein described process of treating impure zinc sulphate solutions, consisting in causing the precipitation of inorganic impurities in the solution by the action of zinc hydrosulfite, separating the precipitate from the solution to obtain a pure solution of zinc sulphate and zinc hydrosulfite, and oxidizing the zinc hydrosulfite to zinc sulphate by passing air into the purified solution.

7. The herein described process of treating impure zinc sulphate solutions, consisting in causing the precipitation of inorganic impurities in the solution by the addition of zinc in divided form, in the presence of sulphate dioxide gas, separating the precipitate from the solution to obtain a pure solution of zinc sulphate and zinc hydrosulfite, and oxidizing the zinc hydrosulfite to zinc sulphate by passing air into the purified solution.

8. The herein described process of treating impure zinc sulphate solutions, comprising the precipitation of inorganic impurities in the solution by the action of a soluble metal hydrosulfite, and separating the precipitate from the solution.

In testimony whereof I have affixed my signature.

ROBERT B. ELDREDGE.